(12) United States Patent
Sloo et al.

(10) Patent No.: US 7,148,930 B2
(45) Date of Patent: *Dec. 12, 2006

(54) SELECTIVELY OVERLAYING A USER INTERFACE ATOP A VIDEO SIGNAL

(75) Inventors: David Hendler Sloo, Menlo Park, CA (US); Steven C. Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/345,459

(22) Filed: Feb. 1, 2006

(65) Prior Publication Data

US 2006/0139373 A1 Jun. 29, 2006

Related U.S. Application Data

(63) Continuation of application No. 10/145,362, filed on May 13, 2002, now Pat. No. 7,027,101, and a continuation of application No. 11/327,229, filed on Jan. 6, 2006.

(51) Int. Cl.
  *H04N 5/445* (2006.01)
(52) U.S. Cl. .......................... 348/564; 348/589; 725/38
(58) Field of Classification Search ................ 348/563, 348/564, 569, 465, 468, 589; 715/788; 345/635, 345/637; 725/38–40, 43; 382/165, 170, 382/171, 176, 203, 204
  See application file for complete search history.

(56) References Cited

U.S. PATENT DOCUMENTS

| | | | | |
|---|---|---|---|---|
| 5,477,274 A | * | 12/1995 | Akiyoshi et al. | ............ 348/468 |
| 5,546,131 A | * | 8/1996 | Terry | ........................... 348/564 |
| RE37,501 E | * | 1/2002 | Song | ........................... 348/564 |
| 6,359,657 B1 | * | 3/2002 | Westerink et al. | ........... 348/584 |
| 6,604,242 B1 | * | 8/2003 | Weinstein et al. | ........... 725/109 |
| 6,710,789 B1 | * | 3/2004 | Sekiguchi et al. | ........... 715/781 |
| 6,785,902 B1 | * | 8/2004 | Zigmond et al. | .............. 725/38 |
| 6,859,236 B1 | * | 2/2005 | Yui | .............................. 348/584 |
| 6,885,406 B1 | * | 4/2005 | Yui et al. | ..................... 348/564 |
| RE39,003 E | * | 3/2006 | Orr et al. | ..................... 348/564 |
| 7,061,544 B1 | * | 6/2006 | Nonomura et al. | .......... 348/568 |
| 2004/0226042 A1 | * | 11/2004 | Ellis | ............................. 725/43 |

* cited by examiner

*Primary Examiner*—Victor R. Kostak
(74) *Attorney, Agent, or Firm*—Workman Nydegger

(57) ABSTRACT

Overlaying visual interface information atop a video signal without obscuring desired features of the video signal. The video signal may contain one or more pre-selected features, such as text. Two or more display sections equally divide the video signal, and any pre-selected features in the video signal are identified as residing in particular display sections. Depending on the nature of the features, the selected visual interface information is placed atop the video signal in a display section not containing any pre-selected features so as not to cover or obscure the features or is placed over specified features that do not significantly contribute to the video signal, such as blank or static screen regions. A hierarchy of preferred display sections for placing the visual interface information may be created to optimize the placement thereof. The methods for overlaying visual interface information find particular application with interactive television systems.

20 Claims, 4 Drawing Sheets

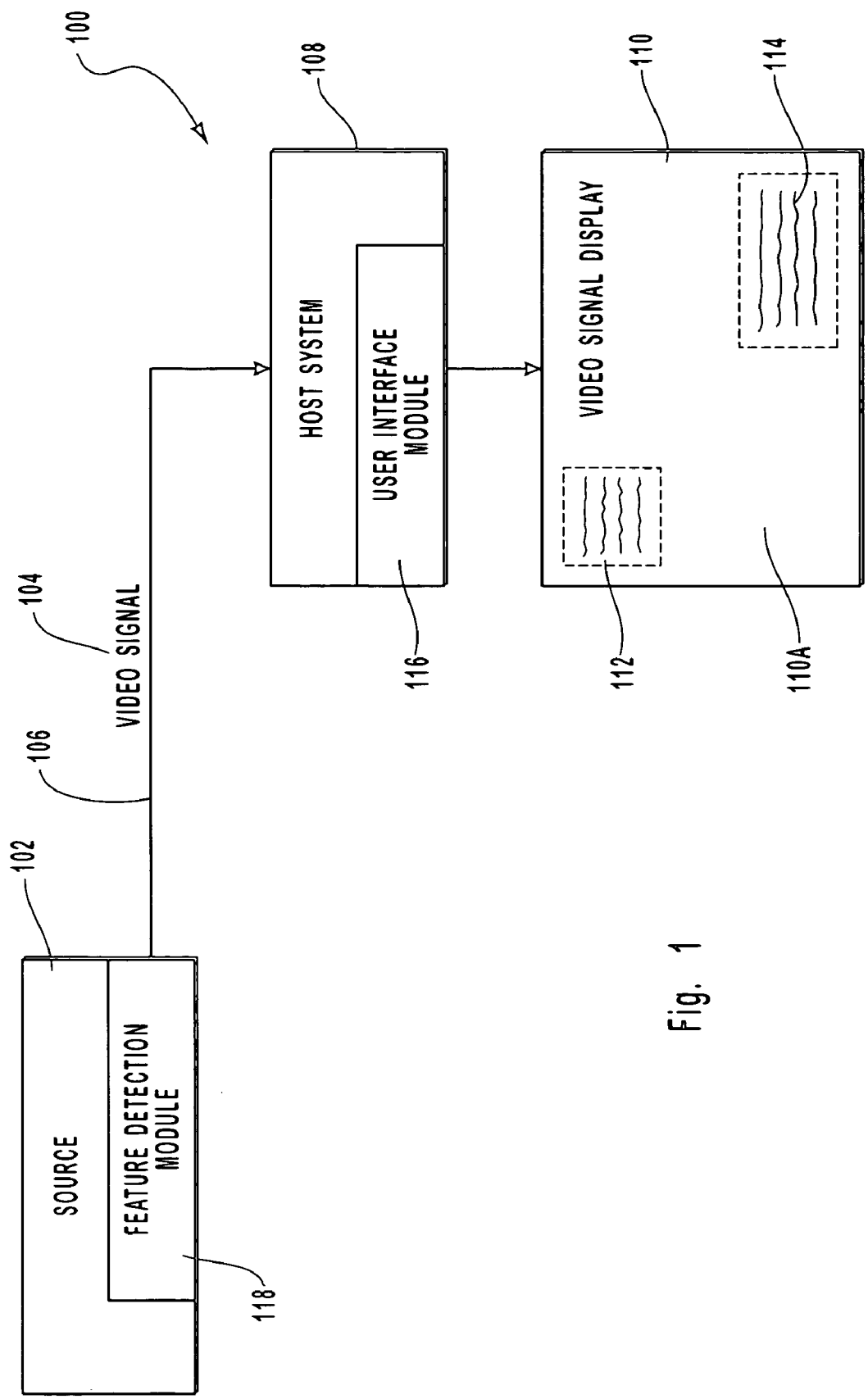

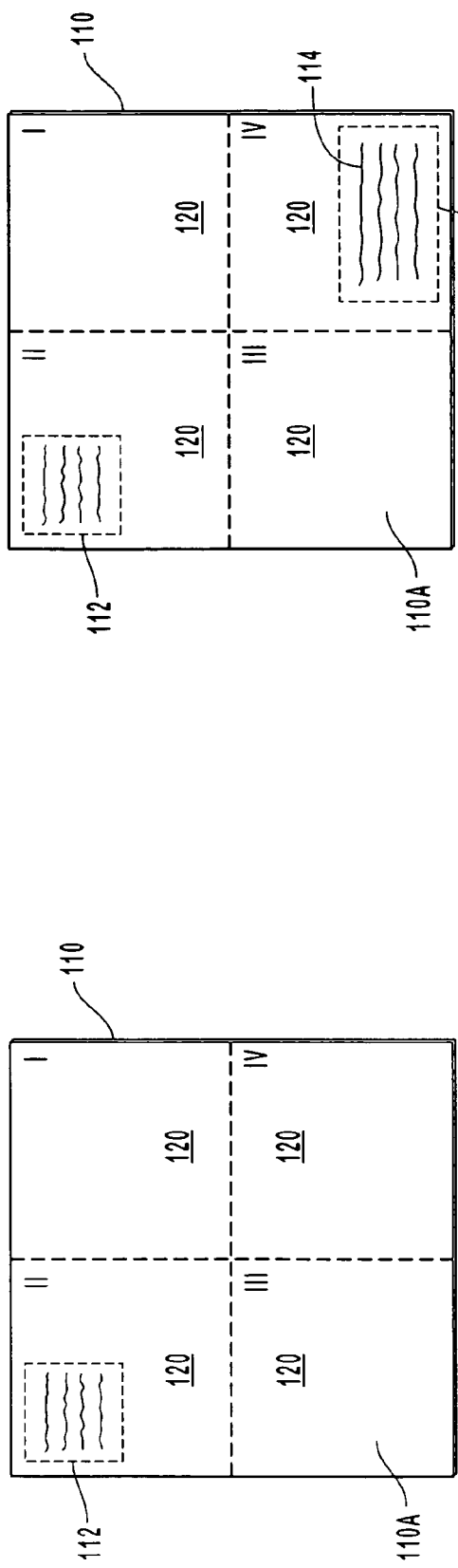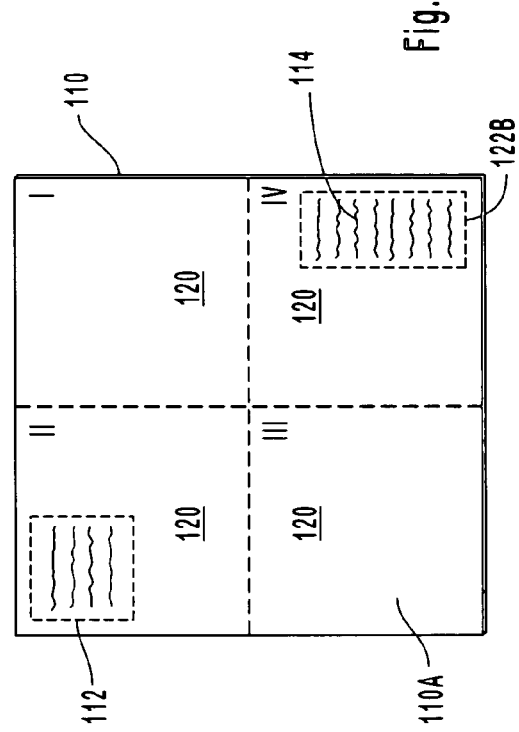
Fig. 2A
Fig. 2B
Fig. 2C

SELECTIVELY OVERLAYING A USER INTERFACE ATOP A VIDEO SIGNAL

CROSS-REFERENCE TO RELATED APPLICATIONS

This application is a continuation of U.S. patent application Ser. No. 10/145,362, filed May 13, 2002 now U.S. Pat. No. 7,027,101, and entitled "SELECTIVELY OVERLAYING A USER INTERFACE ATOP A VIDEO SIGNAL", and which is incorporated herein by reference. This application is also a continuation of U.S. patent application Ser. No. 11/327,229, filed on Jan. 6, 2006, and which is entitled "SELECTIVELY OVERLAYING A USER INTERFACE ATOP A VIDEO SIGNAL", and which is incorporated herein by reference. This application is also related to co-pending U.S. patent application Ser. No. 11/345,459,, filed concurrently with this application, entitled "SELECTIVELY OVERLAYING A USER INTERFACE ATOP A VIDEO SIGNAL" and which is incorporated herein by reference.

BACKGROUND OF THE INVENTION

1. The Field of the Invention

The present invention relates to video signals. More specifically, the present invention relates to methods, systems, and computer program products for selectively displaying a user interface atop a video signal in a televised or computerized system.

2. The Related Technology

A video display unit, such as a television or computer monitor, is an integral component of many computerized systems. By displaying a video signal on the screen of the television or computer monitor, a viewer is able to interact with the system. This interactive ability is central to interactive television systems, where the display unit is continuously employed not only to present information to the user, but also as a means by which the user may input information to the interactive system. For example, interactive television systems may present additional interactive information on the screen of the television from time to time that is specifically synchronized to the program being shown. This additional information may include information concerning the channel or program that is currently displayed, as well as one or more control options for viewer input. For instance, an interactive television system may allow the viewer to play along with a game show that is currently displayed on the television screen. Thus, the ability of an interactive television system to enhance the experience of the viewer by providing additional interactive information on the screen, such as text and graphics, is an important one.

The inclusion of additional interactive information on the television screen by the interactive television system may be hampered, however, by text, graphics, and other information that may be present as part of the original video signal displayed on the television screen. For instance, the video signal of a typical television program that is displayed by an interactive television system may include the name of a person or location shown on the screen that is usually displayed at the bottom of the screen, station and program identification watermarks that are typically displayed in the corners of the screen, and sports scores, player statistics, or other miscellaneous information that may be displayed at various locations on the screen during an athletic event. This information often provides additional satisfaction for the viewer. Thus, if any of this original video signal information is obscured by additional interactive information that is overlaid onto the screen by the interactive television system, frustration of the viewer may result.

In addition to the text-based information explained above, other features or attributes may also be present in the original video signal. These features, such as the faces of characters on a television program or important objects of interest, are also typically desired for viewing by the viewer and should not be obscured by additional interactive information overlaid by the interactive television system. Covering these and other desired objects of interest on the television screen creates confusion and frustration for the viewer.

Additionally, the placement of additional interactive information over areas of the video signal having certain attributes may also be problematic. For instance, interactive information comprising light-colored text would be poorly viewed if overlaid atop a light-colored portion of the displayed video signal. This and other problems related to visual video signal attributes can further confuse and frustrate the viewer.

Several attempts have been made to deal with the problem described above. One attempt has involved shrinking the area of the screen occupied by the video signal to a smaller relative size such that a blank area is provided about the perimeter of the video signal display. This enables the extra-perimeter area to be used for positioning additional interactive information. However, this technique suffers from several disadvantages. Text and other video signal information become less legible due to the smaller size of the display area. Also, the video image, given its smaller size, is less interesting to view. Further, the shrinking of the area occupied by the video signal can require substantial video processing, which may be impossible for certain set-top boxes associated with interactive television systems.

Another attempt at adequately providing additional interactive information has involved making the interactive information partly transparent before overlaying it atop the already-existing video signal. Theoretically, the viewer will be able to view the additional interactive information displayed atop the video signal, while still being able to see the underlying video signal. In practice, however, it has been found that the opacity of the additional interactive information must approach 70% for adequate comprehension. As may be predicted, this correspondingly reduces the quality of the underlying video signal. The result is additional interactive information that serves only to distract the viewer and obscure desirable portions of the video signal.

It is noted that the problem of supplying additional information atop a video signal having one or more features already present therein has been partly addressed through human interaction. That is, a human producer at a television broadcast station, for instance, may dynamically determine where additional screen information should be displayed so as not to cover or obscure pre-existing text or other features on the screen. In short, the producer manually places the additional information in an area of the screen that is, not occupied with other desired visual information. While this technique may be successful for some systems, such as standard television broadcasting, it is limited because of its manual nature. Thus, this technique is not useful for automatically displaying user interface information on an acceptable area of the television screen. Further, this solution does not have applicability to interactive television systems, which are more automated than standard television systems.

A need therefore exists to enable the placement of additional interactive information atop a video signal according to one or more attributes of the video signal. More particularly, a need exists to display interactive information atop a video signal without obscuring specified features, including text, faces, or other visual attributes present in the video signal.

BRIEF SUMMARY OF THE INVENTION

The present invention relates to the display of user interface information atop a video signal according to the position of one or more selected attributes that may be present in the video signal. This, in turn, enables the display of the user interface information on a video display unit, such as a television monitor, in such a way as to optimize the presentation of the information. In this way, text or other desired visual information already present in a video signal is not obscured by the concurrent display of the user interface information. In one embodiment, the user interface information is provided by a host system such as an interactive television system, and is positioned atop the video signal based upon the recognition of one or more specified features, which are comprised of attributes present in the video signal. The attribute(s) comprising the specified feature may be automatically chosen by the host system, or may be defined by the user. Recognition of the presence and relative location of these pre-existing, specified features in the video signal is performed prior to overlaying the user interface information. Once the existence and location of the specified features are identified in the video signal, an appropriate sizing and positioning of the user interface information atop the video signal may then be performed so as not to cover or obscure any of the specified features. In this way, user interface information may be displayed on the television screen or other video display unit without obscuring pre-existing features, such as faces, pre-existing text, and/or colored areas of the screen.

The video signal is displayed via a video signal display unit, such as a television screen or monitor. A host system, such as an interactive television system, video gaming unit, etc., provides the video signal to the display unit. A feature detection module, which may be disposed in any one of several locations, includes hardware and/or programming code for recognizing the presence and position of the attribute(s) of the selected features in the video signal. The information provided by the feature detection module is then used by a user interface module for determining the best location for overlaying user interface information atop the video signal. To do so, the user interface module first virtually subdivides the video signal into two or more sections, and assigns a hierarchy of preferred sections where the user interface information may be overlaid atop the video signal. The user interface module then analyzes the information from the feature detection module to determine which sections already contain attributes comprising the pre-existing features. The hierarchy of preferred sections assigned by the user interface module is then referred to, and the highest ranked section that is not currently occupied by a selected feature is identified. The user interface module overlays the user interface information atop that section. In overlaying the user interface information atop a preferred section, the user interface module may utilize one of two or more defined sub-areas that comprise a specified portion of the section. In this way, the user interface information is placed atop the section in a manner that obscures a relatively small amount of the video signal. Examples of such sub-areas include a horizontally extending rectangle, and a vertically extending rectangle.

The specified feature is comprised of one or more attributes of the video signal, including color, brightness, and high frequency (high detail) regions in the signal. The attribute(s) comprising the specified feature can be automatically chosen by the present system, or manually selected by the user.

In one alternative embodiment, the present invention can be utilized to place user interface information atop the video signal such that it covers specified feature attributes that are not critical to the viewing experience, such as low frequency (blank) areas of the screen, or uniform color regions, such as an area of blue sky, for instance. In this way, the user interface information may be displayed without obscuring more important regions of the displayed video signal.

In another alternative embodiment, selected attributes of the user interface information can be analyzed by the present system, then compared to the attributes comprising the specified feature to enable optimum placement of the user interface information. For example, analysis of the user interface information can reveal that it comprises text having relatively high levels of brightness. The present system can then determine optimum placement for the bright interface information and place it on the screen so as to avoid an area where analysis by the system has revealed a similarly bright specified feature exists.

The present invention can be useful for enabling a computer system, such as an interactive television system, to display additional user interface information atop a video signal. Examples include displaying further information about the program currently being shown, and displaying user controls for enabling the viewer to interact with the program.

As described above, the location and shape of the user interface information to be displayed can be chosen according to which specified features are currently present in the video signal. In another embodiment, however, the user interface information is placed not only according to which features are currently in the video signal, but also which features are about to be displayed. Thus, the user interface module anticipates the position of specified features and overlays its user interface information accordingly. Additionally, this enables the content of user interface information to be selected or adjusted according to what type of specified feature is about to be displayed in the video signal, by giving the user interface module or associated devices time to search for and select the desired information.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates various components with which the invention can be implemented;

FIG. 2A is a view of a monitor or screen displaying a video signal containing a specified feature in one section thereof;

FIG. 2B is a view of the screen of FIG. 2A, also showing user interface information that has been overlaid atop another section of the video signal;

FIG. 2C is yet another view of the screen of FIG. 2A, also showing user interface information that has been overlaid atop a section of the video signal, wherein the user interface information is enclosed within a differing sub-area as compared to FIG. 2B;

DETAILED DESCRIPTION OF THE PREFERRED EMBODIMENTS

Figure 3:
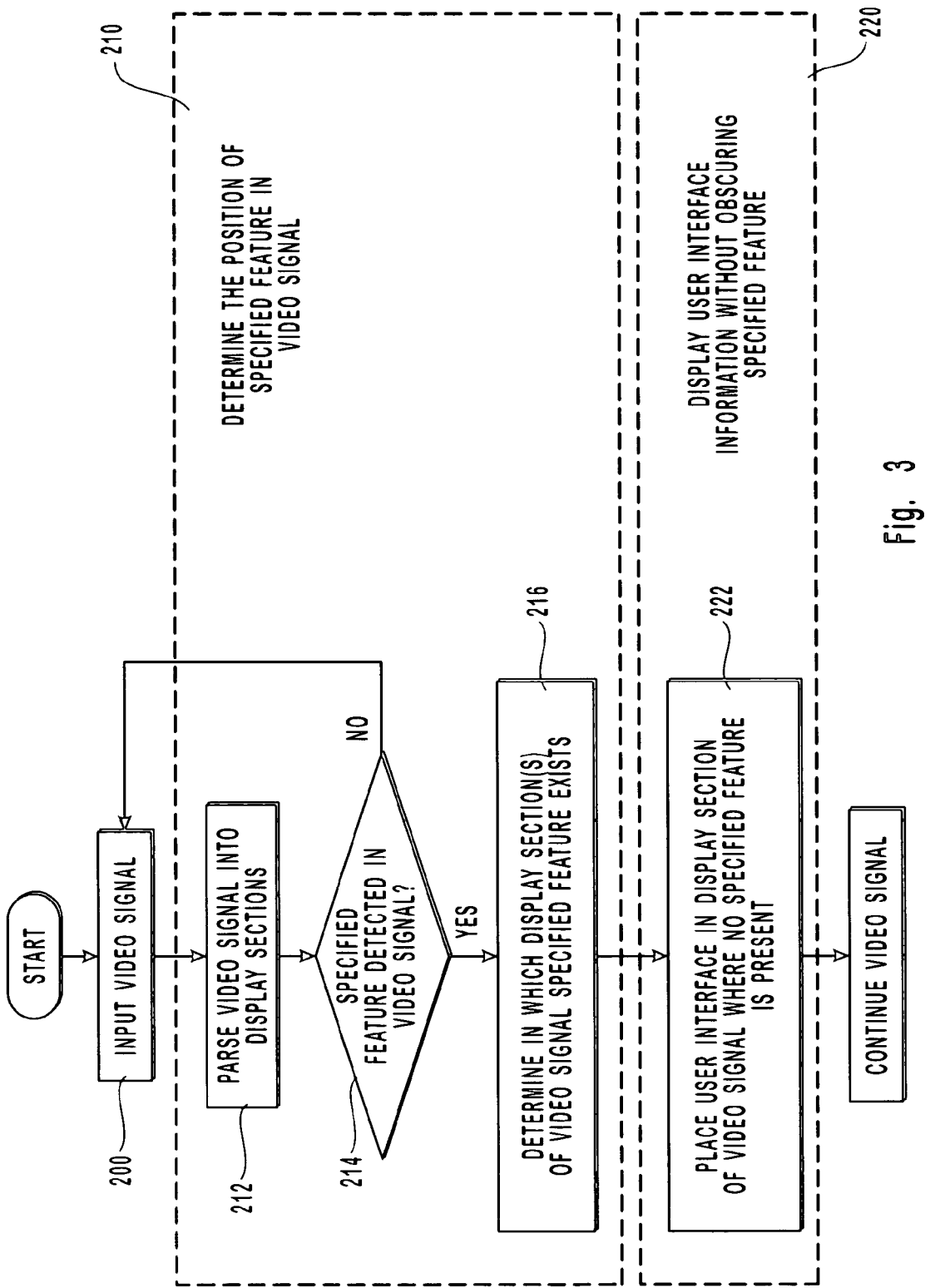
FIG. 3 is a flow chart showing various steps involved in execution of the present invention according to one embodiment.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1 through 4 depict various features of embodiments of the present invention, which is generally directed to selectively overlaying user interface information atop a video signal containing specified features.

Reference is first made to FIG. 1, which depicts various components comprising a video signal display system, generally depicted at 100, and incorporating various elements of one embodiment of the present invention. As seen in FIG. 1, a source 102 provides a video signal 104 over a transmission line 106. The video signal 104 is received by a host system 108, which in the present embodiment comprises an interactive television system. It is appreciated, however, that the host system 108 can comprise other devices, such as a standard television, a gaming console, a computer, etc. Thus, though embodiments of the present invention disclosed herein will be described in connection with an interactive television system, this is not meant to limit the present invention in any way.

The host system 108 transmits the received video signal 104 to a video signal display unit 110. In the present embodiment, the video signal display unit 110 comprises a television monitor having a display screen 110A. Alternatively, the video signal display unit 110 can comprise a computer monitor, or the like. The video signal 104 displayed by the video signal display unit 110 may comprise a television program, a sports broadcast, or any other type of visual information.

The video signal 104 that is transmitted from the source 102 can include regions characterized by one or more video signal attributes that are displayed on the video signal display unit 110. For instance, the video signal display unit 110 as shown in FIG. 1 depicts a box of text residing in the upper left corner of the screen 110A. This text may be characterized by one or more attributes, such as the color of the text, or its brightness. The text shown in FIG. 1, having one or more attributes as described here, is but one example of a specified feature 112 which exists at a specified point in time as a component of the video signal 104. Indeed, the specified feature 112 may comprise one or more of a variety of attributes that together can comprise recognizable objects of the video signal 104, including text, human faces, graphics, animate or inanimate objects, etc. Also, more than one specified feature 112 may be present in the video signal 104 at any given point in time.

As already suggested, the specified feature 112 of the present invention can be defined by one or more of a variety of attributes of the video signal 104. For example, color attributes, such as a region of blue sky, may comprise the specified feature 112. Brightness attributes of the video signal 104 may also be employed. An example of this includes a region of the displayed video signal 104, such as an image of a light, that is brighter than other regions of the signal. Possible attributes also include high image frequency regions of the video signal 104. Image frequency attributes of the video signal 104 include regions where high image detail is present. Generally, this high detail can be detected by the wealth of shapes and surfaces in the particular signal region. Frequency attributes associated with color and brightness can also be employed. Further, a combination of these or other attributes not mentioned can be utilized to define the specified feature 112. The specified feature 112 can also be defined by the absence of a particular attribute. Thus, the enumeration of attributes above is not meant to be an exhaustive listing of all possible attributes that can be employed in connection with the present invention.

The video signal display unit 110, in addition to the video signal 104, can also display on its screen 110A user interface information 114. In contrast to the specified feature 112, which is typically an original component of the video signal 104, the user interface information 114 is placed on the screen 110A atop the video signal by the host system 108. In other words, the user interface information 114 is overlaid upon the video signal 104 as displayed by the display unit 110. It is a feature of one embodiment of the present invention that the user interface information 114 is overlaid atop the video signal 104 in such a way as not to overlap or obscure any specified feature 112, such as the box of text shown in FIG. 1. Thus, the user interface information 114 is displayed atop the video signal 104 in an area where no other specified feature 112 exists, so as not to obscure portions of the video signal that the viewer likely wants to see. More details concerning this are set forth further below.

In one embodiment, the placement of the user interface information 114 is determined by a user interface module 116 which, as shown in FIG. 1, comprises a portion of the host system 108. Alternatively, it is appreciated that the user interface module 116 may comprise a separate device from the host system 108. The specific acts and steps taken by the interface module 116 to ensure the overlaying of user interface information 114 in such as way as not to obscure any specified features 112 are discussed further below.

It is appreciated that the user interface information 114 may comprise text, interactive controls, graphics, or other features that may be displayed to enhance the viewing experience of the viewer. For example, if the video signal 104 comprises a game show, the user interface information 114 may comprise a question related to the game show that the viewer may attempt to answer via the interactive television system. Thus, the question may be displayed in text-block format, such as that shown on the screen 110A in FIG. 1.

A feature detection module 118 is also included as a component of the video signal display system 100, in accordance with one embodiment thereof. The feature detection module 118 is responsible for determining whether a specified feature 112 is present in the video signal 104, and if so, its position. As shown in FIG. 1, the feature detection module 118 may be disposed at or near the source 102 of the video signal 104. However, it is appreciated that feature detection module 118 may reside at various locations along the path of the video signal 104, including a location within or near the host system 108.

In greater detail, the feature detection module 118 in one embodiment comprises hardware and/or programming code that enables it to recognize the presence and location of attributes comprising one or more specified feature in the video signal 104. In order to recognize the specified features, the feature detection module 118 continuously analyzes the video signal 104. When a specified feature possessing the pre-determined attributes is detected, the feature detection module 118 determines its location as it would be seen on the screen of the video display unit. This information is then be encoded into the video signal 104 for later processing by the user interface module 116.

This encoding of the video signal 104 may include the insertion of one or more triggers that identify the presence and location of the specified feature 112. These triggers may then be detected and processed by the user interface module 116 to enable adequate placement of the user interface information 114, as explained further below. It is appreciated, however, that there are a variety of ways by which the feature detection module 118 may signal the presence and location of specified features 112 in the video signal 104. Thus, the above encoding method is not meant to limit the present invention in any way.

As described above, the specified feature 112 detected by the feature detection module 118 may comprise attributes associated with text, such as a sporting event box score or the identification of a person shown in the video signal 104. However, the feature detection module 118 may also be configured to recognize and identify other specified features 112 having attributes indicative of an object, such as a human face, or a region of the video signal 104 where a certain color is predominant. If desired, more than one type of specified feature may be designated to be simultaneously searched for in the video signal 104 by the feature detection module 118. For instance, the feature detection module may be configured to search for and identify blocks of text as well as areas of the video signal 104 where high brightness is present. The designation of which video signal attributes will be searched for as specified features, the number of specified feature types to search for, and other similar feature detection details may be pre-programmed into the feature detection module 118, or they may be user-definable, according to the particular configuration of the video signal display system 100. The feature detection capabilities of the feature detection module 118 are known and described in the art, and thus are not discussed in further detail here.

As described above, the location of the feature detection module 118 may be chosen as necessary to suit the particular application involved. As illustrated in FIG. 1, the feature detection module 118 may be incorporated as a component at or near the source 102 of the video signal 104, comprising part of a video processor, for example, that is configured to analyze the video signal prior to uplink and transmission. In this configuration, the video signal 104 is analyzed by the feature detection module 118 before it is transmitted via the transmission lines 106 to one or more host systems 108. Thus, the identification and analysis of specified features 112 is performed by the feature detection module 118 to the video signal 104 as a whole. This means that each host system 108 connected to the transmission line 106 receives a video signal that has the specified features 112 identically detected within it.

In contrast, it is appreciated that in some embodiments the feature detection module 118 can alternatively be disposed at or near the host system 108 so as to be accessible and programmable by the user of the host system. For instance, in one example, the feature detection module 118 comprises a portion of an interactive television set-top box comprising the host system 108. This configuration enables the viewer to program the feature detection module 118 concerning which specified features 112 the viewer desires the module to detect. As an example of this, the viewer may wish that the user interface information 114 that is to be displayed by the user interface module 116 does not obscure the faces of characters that appear in the video signal 104. Thus, the viewer can program the feature detection module 118 to identify the presence and location of attributes typically indicative of faces appearing in the video signal 104. As already mentioned, this information provided by the feature detection module 118 then enables the user interface module 116 to appropriately display user interface information 114 atop the video signal 104 without obscuring or covering the faces that may be present.

In greater detail, the user interface module 116 in one embodiment comprises hardware and/or programming code for determining the optimum placement of the user interface information 114 atop the video signal 104. This may be accomplished via several functions performed by the user interface module 116, including the virtual parsing of the video signal 104 into two or more display sections. These displays sections may be thought of as defining distinct areas on the screen 110A of the display unit 110 where user interface information 114 may be placed. Additionally, the user interface module 116 also may assign a hierarchy of preferred display sections where a particular type of user interface information 114 would preferably be placed. For example, user interface information that consists of interactive game show questions may best be placed in the upper right-hand corner of the interactive television screen. Thus, the user interface module 116 may assign a hierarchy of preferred display sections where the game show question may be placed, wherein the display section corresponding to the upper right-hand portion of the screen is the most preferred display section to be used. This and other functions of the user interface module 116 are explained in further detail below in connection with FIGS. 2A–2C.

It should be noted here that the above description in connection with FIG. 1 is but one embodiment of the present invention, which enables user interface information to be overlaid atop a video signal. It is, of course, appreciated that the functionality of the present invention described above can also be achieved by other components and devices.

Attention is now directed to FIGS. 2A–2C, which depict various views of the screen 110A of the video signal display unit 110, including various screen elements. In FIG. 2A, the specified feature 112 comprises text, as previously shown in FIG. 1. As can be seen from the figure, the screen 110A has superimposed thereon a series of four quadrants numbered I–IV. These quadrants, referred to here as display sections 120, represent the virtual division of the displayed video signal 104 by the user interface module 116. The division of the screen 110A into the four display sections 120 is not a physical division such that the dashed dividing lines are seen by a viewer; rather, it is a virtual division for facilitating the placement by the user interface module 116 of user interface information 114 atop the video signal 104 without obscuring any specified features 112, such as that shown in FIG. 2A. Though the screen 110A is shown in FIG. 2A as being divided into four display sections 120, it will be appreciated that the screen can be virtually divided into more or fewer sections than this, if desired, to suit a particular application. For instance, two display sections 120 can alternatively be used to bisect the screen 110A.

In accordance with one embodiment of the present invention, the feature detection module 118 determines during transmission of the video signal 104 that a specified feature 112 not only is present in the video signal, but also that it resides within the display section 120 represented by quadrant II, as defined by the user interface module 116. This information is then used by the user interface module 116 in order to display any desired user interface information 114 atop the video signal 104, according to the operation of the host system 108.

FIG. 2B shows an example of one embodiment of the present invention whereby user interface information 114 is displayed along with the specified feature 112, on the screen 110A of the video signal display unit 110. The placement of the user interface information 114 in quadrant IV of the display sections 120 illustrates the operation of the present invention, wherein the user interface information is placed in an area of the screen 110A where obscuring of any specified features 112 will not occur. In this way, only areas of the video signal 104 where no specified features 112 are found will be occupied with user interface information 114. Further, the method by which this is accomplished occurs automatically, thereby eliminating the need for human intervention in displaying the user interface information 114. In this way, both user interface information 114 and any specified features 112 are able to co-exist as displayed by the video signal display unit 110 without obstruction or obscuring of either feature.

It should be noted that the user interface information 114 might also be desirably placed within either quadrants I or III of the display sections 120, given the fact that no specified features 112 exist in those quadrants in FIG. 2B. However, in accordance with one embodiment of the present invention, quadrant IV was chosen by the user interface module 116 as the preferred location for displaying user interface information 114. As explained earlier, this quadrant may be chosen according to a hierarchy defined by the user interface module 116 that determines which quadrant is most preferred to display the user interface information 114, which quadrant is the next-most preferred for displaying the information, which quadrant is the third-most preferred quadrant, etc. Thus, if the most preferred quadrant according to the module-defined hierarchy is occupied by one or more specified features 112, selection by the user interface module 116 of the next-most preferred quadrant having no specified features therein will occur.

It should be appreciated that more than one specified feature 112 may exist on the screen 110A of the video signal display unit 110 such that more than one of the display sections 120 are occupied with such features. In this case, the hierarchy of preferred display sections 120 in which the user interface information 114 should most desirably be displayed is scanned until a display section is found in which no specified features 112 are encountered. Thus, the user interface information 114 is placed in the highest ranked display section 120 in which none of the specified features 112 is found.

Reference is now made to FIG. 2C, which shows the specified feature 112 and user interface information 114 displayed on the screen 10A, similar to FIG. 2B. In contrast to FIG. 2B, however, FIG. 2C shows the user interface information 114 occupying a differently shaped information sub-area 122B within quadrant IV of the display sections 120. The user interface module 116 may define one or more information sub-areas 122 in which the user interface information 114 may be displayed. For instance, FIG. 2B shows the user interface information 114 contained within an information sub-area 122A that comprises a horizontally extending rectangle within quadrant IV. In contrast to this, FIG. 2C shows the same user interface information 114 displayed in a vertically extending rectangle. Thus, one or more information sub-areas 122 may be defined by the user interface module 116 for containing the text and/or other feature comprising the user interface information 114. Additionally, these shapes may be user-defined within the host system 108 such that a viewer may specify the shapes of the information sub-area 122 in which the user interface information 114 will be contained. For instance, a viewer may designate that user interface information 114 is displayed in a vertical rectangle information sub-area 122B as that shown in FIG. 2C, thereby freeing up more space towards the middle of the screen 110A where faces and other interesting features of the video signal 104 are traditionally displayed. Alternatively, the shapes of the information sub-area 122 may be automatically chosen and/or encoded into the user interface module 116 or host system 108.

In addition to the shapes of the information sub-areas 122, which in one embodiment may be user-defined as discussed above, other aspects of the present invention may also be user-definable. For example, the number of display sections 120 that are used by the feature detection module 118 and the user interface module 116 may be user-defined. Similarly, the preferred hierarchy of display sections 120 can be defined by the user, as well as how often user interface information 114 is displayed on the screen 110A. Also, the user may define which specified features 112 should be avoided by the user interface module 116 when deciding where to position the user interface information 114. For example, the user can define that faces are not to be covered by user interface information 114, or that text appearing in the upper left-hand display section of the screen 110A, where sporting event box scores traditionally appear, should not be covered. Thus, various parameters of the present invention may be either automatically defined by the user interface module 116, or by the user of the host system 108, depending on the particular application.

In another embodiment of the present invention, the video signal display system 100 can be programmed to overlay the user interface information 114 atop the video signal 104 in order to cover the specified feature 112. This may occur where the specified feature 112 comprises attributes of the video signal that would not significantly detract from the viewing experience if obscured by the user interface information 114. Examples of such attributes of the video signal 104 include low color frequency regions, such as black regions at the top and bottom of the screen 110A that are present in "letterbox" display formats, blue sky areas, or the green fairway regions that may be present in a golfing broadcast. For instance, blue sky may be either automatically or user-selected as the attribute comprising the specified feature 112 over which the user interface information 114 may be placed. In this case, the feature detection module 118 searches for any portions of the video signal 104 containing regions of blue sky. When such regions having this color frequency attribute are found and located, the user interface information 114 can then be overlaid atop the display section 120 containing the blue sky region by the user interface module 116. If no blue sky regions are present in the video signal 104, the user interface module 116 can select the next preferred location in which to place the user interface information 114. Thus, in general, the location where the visual interface information is to be displayed is selected with respect to the position of the specified feature and is selected either to obscure or to not obscure the specified feature, depending on the nature of the selected feature.

It is also appreciated that the user interface module 116 can choose the location for display of the user interface information 114 according to the detection of regions of the video signal 104 that are static over a specified period of time, i.e., regions where no dynamic change of the video display occurs over time. In this case, the user interface module 116 can overlay the user interface information 114 atop these static regions. These static regions can be detected by the feature detection module 118, or other suitable video signal processor. In one implementation, the static regions are identified by analyzing a compressed digital video stream to identify skipped macroblocks. Skipped macroblocks generally represent portions of the video image that are static over time. Macroblocks representing the user interface data are then substituted for the skipped macroblocks or the user interface is otherwise combined with or overlaid on the static portion of the image.

In yet another embodiment of the present invention, the user interface module 116 can choose the location for display of the user interface information 114 based on an analysis and comparison by the feature detection module 118 and/or the user interface module 116 of selected attributes of both the specified feature 112 and the user interface information itself. In one implementation of this embodiment, selected attributes of the specified feature 112 are detected by the feature detection module 118 and received by the user interface module 116. The user interface module 116 then compares these attributes to the selected attributes of the user interface information 114 and determines the optimum display section 120 in which to display the information. For example, the selected attribute may comprise color. Thus, when a specified feature 112 having the selected color attribute is detected by the feature detection module 118, this information is relayed to and received by the user interface module 116. The user interface module 116, either before or after receipt of the information from the feature detection module 118, analyzes the color attributes of the user interface information 114 to be displayed, then compares its attributes to those of the specified feature 112. The user interface module 116 then determines from this comparison of the color attributes where to place the user interface information 114 so as to optimize its presentation atop the video signal 104. For instance, this placement may prevent blending of the colors of the specified feature 112 and the displayed user interface information 114 so that the viewer may easily read the presented information on the screen 110A. The selected attributes to be compared between the specified feature 112 and the user interface information 114 can be automatically chosen by components of the display system 100, or may be selected by the user.

Embodiments of the present invention may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

FIG. 3 illustrates a flow diagram showing acts and steps for a method of overlaying user interface information atop a video signal according to one embodiment of the present invention. An act 200 includes inputting a video signal 104 that may contain one or more specified features 112, as explained above. A step 210 for determining the position of a specified feature 112 in the video signal 104 may include an act 212 of parsing the video signal into two or more display sections 120. For example, the video signal 104 as shown in FIGS. 2A–2C has been parsed into four display sections 120, shown as four quadrants.

The step 210 for determining the position of a specified feature 112 in the video signal 104 may further include an act 214 of inquiring of whether the specified feature 112 is detected in the video signal 104. If the inquiry of act 214 is answered in the negative, control is returned to act 200. However, if act 214 is answered in the affirmative, control is transferred to act 216, which also comprises a part of the step 210. Specifically, act 216 includes determining in which display section(s) 120 of video signal 104 a specified feature 112 exists. For example, in FIG. 2A the specified feature 112 is found in quadrant II of the display sections 120.

The information acquired from step 210 for determining the position of a specified feature 112 in video signal 104 may, in one embodiment, be encoded as a trigger directly into the video signal. In this way, the information acquired by step 210 may be used in later steps.

The method illustrated in FIG. 3 further comprises a step 220 for displaying user interface information 114 without obscuring the specified feature 112. Step 220 may include an act 222 of placing the user interface information 114 in a display section 120 of the video signal 104 where no specified feature 112 is present. In one embodiment, act 222 may be accomplished by detecting the trigger previously encoded in the video signal 104 and using the information provided by that trigger to determine which display sections 120 are free from the specified feature 112, thereby enabling placement in those sections of the user interface information 114. For example, a trigger encoded by a feature detection module 118 into the video signal 104 may be detected by the user interface module 116 (see FIG. 1). The trigger preferably contains information concerning which specified features 112 are present in the video stream 104, and in which display section the feature will be displayed. This trigger information then enables the user interface module 116 to place user interface information 114 in one or more of the non-occupied display sections 120.

In one embodiment, act 222 may also involve creating a hierarchy of preferred display sections 120 where user interface information 114 is desirably displayed atop the video signal 104, subject to the presence of specified features 112 therein.

Once the user interface information 114 has been appropriately placed atop the video signal 104 such that no specified feature 112 is obscured thereby, the information may remain displayed for a pre-determined amount of time, or until the user takes action to remove it from the screen. During the time that the user interface information 114 is displayed atop the video signal 104, it may be possible that a specified feature 112 may appear underneath the user interface information as part of the continually changing video signal 104. If this occurs, embodiments of the present invention provide options whereby the user interface information 114 either remains in its original location, is automatically moved to the next preferred display section 120 according to the hierarchy of desired sections created by the user interface module 116, or is automatically removed.

It is appreciated that in some instances no specified feature 112 may be detected by the feature detection module 118. If this occurs, the user interface module can place the user interface information in a specified display section 120 according to a preferred hierarchy of such sections as determined by the user interface module 116.

In one embodiment, the specified feature 112 comprises attributes related to a block of text as shown in FIGS. 2A–2C. In other embodiments, and as already discussed, the specified features can comprise other attributes as described above, such as brightness or color regions of the video signal 104. In the latter case, the present invention provides for the identification and localization of such color regions so as to enable the placement of user interface information 114 such that it avoids the colored area. This may be desirable, for example, to ensure contrast between the color of the text of the user interface information 114 and the background color region in the video signal 104. This feature of the present invention may also be desirably applied to subtitling applications, where light colors could be detected in the underlying video signal on a television screen, which would otherwise obscure the traditionally white text of subtitles, thereby preventing an easy reading thereof by the user. In this case, the subtitles may be moved by the present invention to another display section 120 or, alternatively, the user interface module 116 may change the color of the text comprising the subtitles so that they are easily seen atop the light colored area present in the video signal 104. These and other scenarios illustrate but a few of benefits derived from embodiments of the present invention.

As suggested above, the user interface information 114 may comprise text-based subtitles or captions. In one embodiment, the user interface information 114, comprising subtitles, captions, or other information, may be input into the user interface module 116 via a data stream that is separate from the video signal 104, or from a data stream transmitted as a discrete component of the video signal. In either case, the user interface module 116 or other suitable video processing component can combine the separate data, comprising the user interface information 114, with the video signal 104 and display them in accordance with the principles described herein.

This embodiment can find particular application in standard, non-interactive television systems, and can be applied at any of several points in the video signal distribution chain, such as at the television or set-top box, at the source of creation or transmission of the video signal, or at a regional receiver that services multiple television terminals. Examples of the source of creation or transmission of a video signal include a television broadcaster, a satellite transmitter, a cable head end, and the like. Examples of regional receivers include video signal receivers operated by businesses, schools, airports, or in other settings where a single receiver is used for multiple television terminals. In those situations where the user interface information 114 is combined at some point upstream of the television or set-top box, the user interface module 116 is located at the upstream point in the video signal distribution chain.

It is appreciated that at times the specified feature 112 may occupy portions of more than one display section 120. If this occurs, embodiments of the present invention provide for positioning of the user interface information 114 in a display section 120 where no portion of the specified feature 112 is present. Should the specified feature 112 occupy portions of all display sections 120 of the video signal 104, an automatic or user-defined decision can be made beforehand that would provide either that the user interface information 114 is not displayed at all, or that the best possible display section obscuring the least amount of the specified feature 112 is chosen for overlaying the user interface information.

Embodiments of the present invention can be configured to detect and account for moving as well as stationary specified features 112. The detected movement is then taken into account when determining in which display section 120 to display the user interface information 114. The ability of the present invention to account for moving specified features 112 can also find applicability where the specified feature is the face of a character or actor displayed in the video signal 104 on television and who may continuously move from display section to display. This movement can be accounted for by the user interface module 116 in determining where to place the user interface information 114 so as to obscure as little as possible of the face of the character.

In yet another embodiment, the present invention incorporates a video signal buffer or similar device in order to anticipate upcoming changes in the presence and/or location of specified features 112 in the video signal 104. Such changes to the specified feature 112 include the upcoming appearance of text, or the movement of text already present in the video signal 104 from one display section 120 to another. The use of a signal buffer enables the user interface module 116 to determine where and/or whether to position the user interface information 114 according not only to what is presently displayed in the video signal 104, but also according to what will be displayed at a predetermined future point in time.

The use of a signal buffer or similar device also enables embodiments of the present invention to select items to be displayed as user interface information 114 according to the type of specified feature 112 that is about to be displayed in the video signal 104. In other words, the signal buffer temporarily suspends successive portions of the video signal 104, which in turn gives the user interface module 116 enough time to look for and select information that is complementary to the upcoming specified feature 112 about to be released from the signal buffer and displayed in the video signal. This correlation between the content of the upcoming specified feature 112 and the user interface information 114 requires some analysis of the nature and content of the specified feature about to be displayed. An overlay buffer may also be required to further correlate the display of the user interface information 114 with the upcoming specified feature 112, as may be appreciated by one skilled in the art.

Figure 4:
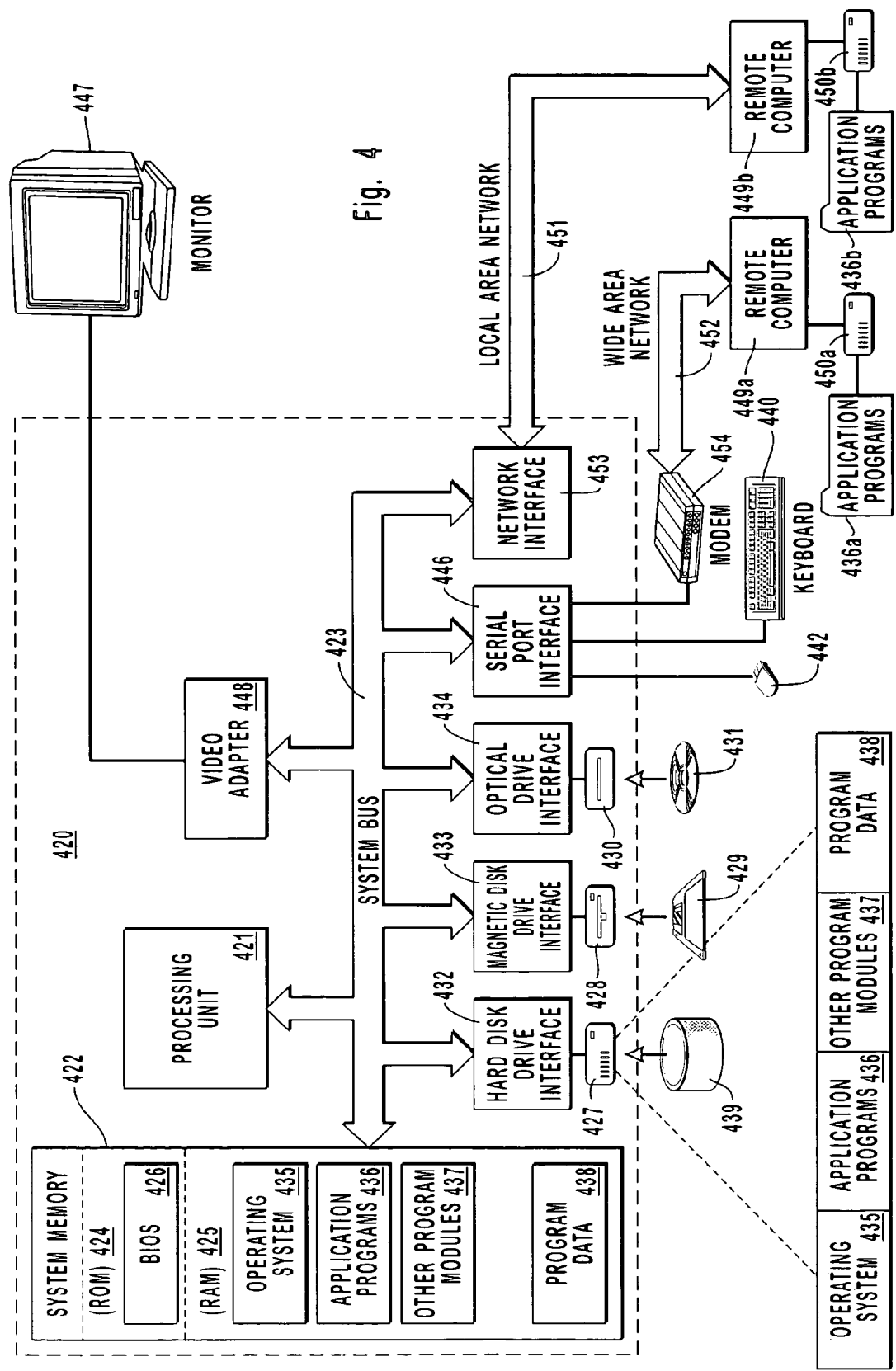
FIG. 4 illustrates a system that provides a suitable operating environment for embodiments of the present invention.

FIG. 4 illustrates an example system that provide suitable operating environment for the present invention. Embodiments within the scope of the present invention may comprise one or more special purpose and/or one or more general purpose computers including various computer hardware, as discussed in greater detail below. However, it should be emphasized that the present invention is not necessarily limited to any particular computerized system. The following examples systems, therefore, should not be interpreted as imposing any particular environmental requirements on the present invention.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media may comprise physical storage media such as RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, television set-top boxes, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference then to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. The system also includes a television 447 or another display device on which the video signals, with the overlaid user interfaces of the invention, are displayed.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a computerized system having a display unit for displaying a video signal that is capable of including at least one specified feature, a method of selectively moving visual interface information that is overlaid atop the video signal, the method comprising:

displaying the video signal on the display unit;

displaying the visual interface information with the video signal on the display unit parsing the video signal into at least two display sections;

searching the video signal for the at least one specified feature;

if the at least one specified feature is detected in the video signal, examining the video signal to determine in which display section the at least one specified feature is located; and selectively changing the display of the visual interface information in response to detecting the at least one specified feature in a particular display section of the at least two display sections.

2. A method as recited in claim 1, wherein selectively changing the display of the visual interface information includes moving the video signal to a display section where the at least one specified feature is absent.

3. A method as recited in claim 1, wherein selectively changing the display of the visual interface information includes changing a color of text in the visual interface information.

4. A method as recited in claim 1, wherein selectively changing the display of the visual interface information includes moving subtitles.

5. A method as recited in claim 1, further including:
anticipating a future position of the at least one specified feature.

6. A method as recited in claim 5, wherein anticipating a future position includes:
providing a signal buffer that receives the video signal and outputs a buffered video signal; and
searching a portion of the buffered video signal for the at least one specified feature.

7. A method as recited in claim 5, further including:
selectively adjusting a display of the visual interface information based upon the anticipated future position of the at least one specified feature.

8. A method as recited in claim 7, wherein selectively adjusting a display of the visual interface information based upon the anticipated future position of the at least one specified feature includes moving the visual interface information.

9. A method as recited in claim 8, wherein moving the visual interface information includes moving the visual information to a display section in a successive portion of a buffered video signal to a display section where the at least one specified feature is absent.

10. A method as defined in claim 1, further comprising:
encoding the video signal with information concerning a presence and the location of the at least one specified feature that is detected in the video signal.

11. A method as defined in claim 1, wherein the at least one specified feature comprises at least one attribute of the video signal selected from the group consisting of text, color, brightness, frequency, and any combination of these attributes.

12. A method as defined in claim 1, wherein the at least one specified feature comprises a region of the video signal having a high visual frequency.

13. A method as defined in claim 1, wherein the visual interface information comprises text, and wherein the at least one specified feature comprises a region of color present in the video signal.

14. A method as defined in claim 1, wherein the visual interface information comprises text-based subtitles.

15. A method as defined in claim 1, further comprising:
detecting changes in the at least one specified feature; and
changing content of the visual interface information to be selectively displayed according to changes in the at least one specified feature.

16. In a computerized system having a display unit for displaying a video signal, a method of selectively overlaying visual interface information atop the video signal, the video signal including at least one specified feature, the method comprising acts of:
receiving a video signal to be displayed;
designating a placement for displaying visual interface information atop the video signal;
buffering the video signal;
parsing the buffered video signal into at least two display sections;
searching a portion of the buffered video signal for the at least one specified feature;
if the at least one specified feature is detected in the portion of the buffered video signal, examining the portion of the buffered video signal to determine in which display section the at least one specified feature will be located when the portion of the buffered video signal is displayed; and
selectively changing the designated placement in which the visual interface information is to be displayed based upon the detection of the specified feature in a particular display section, and in such a manner that a position of the visual interface information is moved during display of the video signal and visual interface information responsive to the at least one specified feature.

17. A method as recited in claim 16, wherein the position of the visual interface information is moved such that it is placed atop a display section in the buffered video signal where the at least one specified feature is absent.

18. A method as defined in claim 16, further comprising an act of:
choosing content of the visual interface information to be selectively displayed according to changes in the at least one specified feature.

19. A computer program product comprising one or more computer-readable media having computer-executable instructions for implementing the method recited in claim 1.

20. A computer program product comprising one or more computer-readable media having computer-executable instructions for implementing the method recited in claim 16.

* * * * *